(12) United States Patent
Do (10) Patent No.: US 8,234,281 B2
(45) Date of Patent: Jul. 31, 2012

(54) METHOD AND SYSTEM FOR MATCHING ADVERTISING USING SEED

(75) Inventor: Gwan-Pyo Do, Gyeonggi-do (KR)

(73) Assignee: NHN Business Platform Corporation, Seongnam-Si (KR)

( * ) Notice: Subject to any disclaimer, the term of this patent is extended or adjusted under 35 U.S.C. 154(b) by 826 days.

(21) Appl. No.: 11/685,284

(22) Filed: Mar. 13, 2007

(65) Prior Publication Data

US 2007/0220040 A1 Sep. 20, 2007

(30) Foreign Application Priority Data

Mar. 14, 2006 (KR) .................. 10-2006-0023648

(51) Int. Cl.
*G06F 17/00* (2006.01)
(52) U.S. Cl. ......................................... 707/738
(58) Field of Classification Search .................. None
See application file for complete search history.

(56) References Cited

U.S. PATENT DOCUMENTS

| | | | | |
|---|---|---|---|---|
| 5,761,388 | A * | 6/1998 | Nomoto et al. ............... | 706/52 |
| 6,826,572 | B2 * | 11/2004 | Colace et al. ................. | 707/10 |
| 7,043,483 | B2 * | 5/2006 | Colace et al. ................. | 707/10 |
| 2003/0093285 | A1 * | 5/2003 | Colace et al. ................. | 705/1 |
| 2004/0093327 | A1 | 5/2004 | Anderson et al. | |
| 2004/0186778 | A1 * | 9/2004 | Margiloff et al. ............. | 705/14 |
| 2004/0260689 | A1 * | 12/2004 | Colace et al. ................. | 707/3 |
| 2005/0021397 | A1 | 1/2005 | Cui et al. | |
| 2005/0165615 | A1 | 7/2005 | Minar | |
| 2005/0209992 | A1 * | 9/2005 | Kikinis et al. ................ | 707/1 |
| 2005/0228797 | A1 * | 10/2005 | Koningstein et al. ......... | 707/100 |
| 2006/0064427 | A1 * | 3/2006 | Segal et al. ................... | 707/100 |
| 2006/0171520 | A1 * | 8/2006 | Kliger ........................ | 379/218.01 |
| 2006/0206508 | A1 * | 9/2006 | Colace et al. ................. | 707/100 |
| 2006/0206516 | A1 * | 9/2006 | Mason ......................... | 707/102 |
| 2006/0212350 | A1 * | 9/2006 | Ellis et al. .................... | 705/14 |
| 2006/0287913 | A1 * | 12/2006 | Baluja ......................... | 705/14 |

(Continued)

FOREIGN PATENT DOCUMENTS

JP 2002117049 4/2002

(Continued)

OTHER PUBLICATIONS

Kenji Kawada, Long-Tailed Net Advertisements Open an Era of a Market Having a Sum of 100 Million, Internet Magazine Makes Innovation With Technology!, Japan, Ltd., Impress, Mar. 1, 2006, No. 134, p. 36-38.

*Primary Examiner* — Charles Kim
*Assistant Examiner* — Kurt Mueller
(74) *Attorney, Agent, or Firm* — Husch Blackwell LLP (57) ABSTRACT

A method of generating an advertising list using a seed, which can include a plurality of advertisers or a plurality of keywords with an identical property in a single seed and thereby can display various types of advertising information of the plurality of advertisers, which are included in the seed, according to a single condition, and an advertising matching system is provided. According to the present invention, it is possible to provided a method of generating an advertising list using a seed, which can determine a property of a content page using a seed, and thereby can display various types of advertising information of a plurality of advertisers with the determined property, as contextual advertising, for a user, and an advertising matching system using the method.

14 Claims, 7 Drawing Sheets

U.S. PATENT DOCUMENTS

| | | | |
|---|---|---|---|
| 2007/0027865 A1* | 2/2007 | Bartz et al. | 707/5 |
| 2007/0038614 A1* | 2/2007 | Guha | 707/4 |
| 2007/0143176 A1* | 6/2007 | Nong et al. | 705/14 |
| 2007/0219987 A1* | 9/2007 | Mueller et al. | 707/5 |
| 2008/0046315 A1* | 2/2008 | Axe et al. | 705/14 |
| 2008/0046411 A1* | 2/2008 | Lee | 707/3 |
| 2008/0097813 A1* | 4/2008 | Collins et al. | 705/8 |
| 2008/0243617 A1* | 10/2008 | Song et al. | 705/14 |

FOREIGN PATENT DOCUMENTS

| | | |
|---|---|---|
| JP | 2002216007 | 8/2002 |
| JP | 2003242159 | 8/2003 |
| KR | 10-2005-0049750 A | 5/2005 |
| KR | 2005-0074457 | 7/2005 |
| WO | 2004028234 A2 | 4/2004 |
| WO | 2005116874 A1 | 12/2005 |
| WO | 2006026030 A2 | 3/2006 |

* cited by examiner

| ADVERTISER | KEYWORD | ADVERTISING INFORMATION |
|---|---|---|
| GAP | DICA MEMORY | DIGITAL CAMERA SALE |
| EUL | DICA MEMORY<br>EXPENSIVE DIGITAL CAMERA | DICA MEMORY SHOP |
| BYUNG | EXPENSIVE DIGITAL CAMERA | EXPENSIVE DIGITAL CAMERA SALE | ii)  SEED 'DIGITAL CAMERA'

ADVERTISER GROUP ( ADVERTISER GAP
  ADVERTISER EUL
  ADVERTISER BYUNG )

KEYWORD GROUP ( DICA MEMORY
  EXPENSIVE DIGITAL CAMERA )

ADVERTISING LIST

DIGITAL CAMERA SALE – DIRECT IMPORT, OLD DIGITAL CAMERA SALE

DICA MEMORY SHOP – CHEAPEST MEMORY SALE

EXPENSIVE DIGITAL CAMERA SALE – DISCOUNT EVENT FOR NEW TERM

FIG. 4

CONTENT PAGE

CURRENT DIGITAL CAMERA MARKET STATE

A SELLING PORTION OF EXPENSIVE DIGITAL CAMERAS, EQUIPPED WITH AN IMPROVED DICA MEMORY, INCREASED

...

ADVERTISING LIST

DIGITAL CAMERA SALE – DIRECT IMPORT, OLD DIGITAL CAMERA SALE

DICA MEMORY SHOP – CHEAPEST MEMORY SALE

EXPENSIVE DIGITAL CAMERA SALE – DISCOUNT EVENT FOR NEW TERM

IDENTIFIED TEXT-IN-KEYWORD ( DICA MEMORY
EXPENSIVE DIGITAL CAMERA )

DETERMINED SEED

'DIGITAL CAMERA'

FIG. 7

METHOD AND SYSTEM FOR MATCHING ADVERTISING USING SEED

CROSS-REFERENCE TO RELATED APPLICATION

This application claims the benefit of Korean Patent Application No. 10-2006-0023648, filed on Mar. 14, 2006, in the Korean Intellectual Property Office, the disclosure of which is incorporated herein by reference.

BACKGROUND OF THE INVENTION

1. Field of the Invention

The present invention relates to a method of generating an advertising list using a seed, which can include a plurality of advertisers or a plurality of keywords with an identical property in a single seed and thereby can display various types of advertising information of the plurality of advertisers, which are included in the seed, according to a single condition, and an advertising matching system.

2. Description of Related Art

Among current advertising services, a contextual advertising service identifies a content of a web document that a user reads, and displays advertising corresponding to the identified content for the user. The contextual advertising service may identify an advertising category in which the user is interested, from the web document that the user is currently reading. Also, the contextual advertising service may readily display advertising corresponding to the identified advertising category for the user. In this aspect, the contextual advertising service is in the commercial spotlight.

As an example, when a user reads a web document about 'flower', an advertising server supporting the contextual advertising service may identify advertising associated with 'flower delivery', and display the identified advertising for the user.

However, in the conventional contextual advertising service, an advertiser may display advertising information only when a keyword purchased by the advertiser is included in a web document. Therefore, there is some constraint on the contextual advertising service that the advertiser utilizes. As an example, when the web document relates to 'flower', however, excludes a keyword 'flower delivery', an advertiser who purchased the keyword 'flower delivery' may not display advertising information of the advertiser via contextual advertising.

Accordingly, if an advertising matching method capable of identifying a property of a web document as 'flower', and searching for various types of advertising information associated with the property 'flower' is provided, the advertiser who purchased the keyword 'flower delivery' may display the advertising information according to the property 'flower' via the contextual advertising even when the web document excludes the keyword 'flower delivery'.

Accordingly, a new advertising matching model capable of simultaneously displaying various types of advertising information of a plurality of advertisers with an identical property for a user according to a single condition is required.

BRIEF SUMMARY

An aspect of the present invention provides a method of generating an advertising list using a seed, which can determine a property of a content page using a seed, and thereby can display various types of advertising information of a plurality of advertisers with the determined property, as contextual advertising, for a user, and an advertising matching system using the method.

Another aspect of the present invention also provides a method of generating an advertising list using a seed, which can construct a keyword which is not associated with a plurality of seeds, and associate the keyword with only a single seed, and thereby can more accurately determine a seed of the content page, and an advertising matching system using the method.

According to an aspect of the present invention, there is provided a method of matching advertising, the method including the steps of: receiving a selection of a keyword associated with advertising information from each of a plurality of advertisers; including the plurality of advertisers, selecting a first keyword, in a single seed; storing an advertising list in an advertising database corresponding to the seed, the advertising list being generated by using advertising information of the plurality of advertisers included in the seed; identifying a text-in-keyword from a content page that is generated according to a predetermined procedure; determining a seed of the content page by considering the identified text-in-keyword; and extracting an advertising list corresponding to the determined seed from the advertising database.

According to another aspect of the present invention, there is provided a system for matching advertising, including: a seed generator receiving a selection of a keyword associated with advertising information from each of a plurality of advertisers, and including the plurality of advertisers, selecting a first keyword, in a single seed; an advertising database storing an advertising list corresponding to the seed, the advertising list being generated by using advertising information of the plurality of advertisers included in the seed; a keyword identifier identifying a text-in-keyword from a content page that is generated according to a predetermined procedure; a seed determination component determining a seed of the content page by considering the identified text-in-keyword; and a list extractor extracting an advertising list corresponding to the determined seed from the advertising database.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

The term 'seed' used throughout the present specification may indicate identification information associated with a group of keywords or a group of advertisers (companies) with a similar property. The seed is a concept which the present applicant, providing keyword advertising services including contextual advertising, learned from long-term experiments and experiences. The present applicant discovered a common property from advertisers who purchased an identical keyword in keyword advertising, and defined a group of the advertisers as the seed. Also, the present applicant discovered a common property from keywords that a particular advertiser purchased in keyword advertising, and defined a group of the keywords as the seed.

In the present specification, the seed is utilized to determine a property of a content page that a user is currently reading. Also, the seed is utilized to retrieve advertising information corresponding to the determined property (content) and display the retrieved advertising information for a user.

Also, in the present specification, a single seed is simultaneously associated with a group of advertisers and a group of keywords, which is for convenience of description. In this instance, each of keywords that a particular advertiser purchases for contextual advertising is associated with only a single seed. Specifically, each of the keywords is not associated with a plurality of seeds. Accordingly, a confusion does not occur to determine a property of a content page. As an example, in the present invention, purchase information of 'lens', which may be associated with a plurality of seeds, is excluded. Specifically, only a keyword capable of concretely determining a property of a content page, such as 'camera lens', 'contact lens', and the like, is utilized. Therefore, a seed associated with the keyword may be explicitly determined. If 'lens', which may be associated with the plurality of seeds, is purchased, it is possible to induce the seed to be explicitly determined by excluding the purchase information.

Specifically, in the present invention, the seed corresponds to a search reference with respect to advertising information. An advertising matching system according to the present invention may retrieve advertising information (advertising list) according to a seed of a content page and enable optimal advertising marketing corresponding to the content.

Retrieval of advertising information using the seed may be retrieval of advertising information for contextual advertising which provides advertising information corresponding to the content of the content page.

In this instance, the contextual advertising may indicate an advertising technology which displays advertising for a user according to the content of the content page. As an example, when a content page about 'graduation' is displayed for a user, an advertising matching system may synthetically analyze keywords (text-in-keyword) included in the content page, determine a seed of the content page as 'graduation', and display advertising information associated with the determined seed, 'graduation', for example, graduation gift, flower delivery, and the like, for the user.

Figure 1:
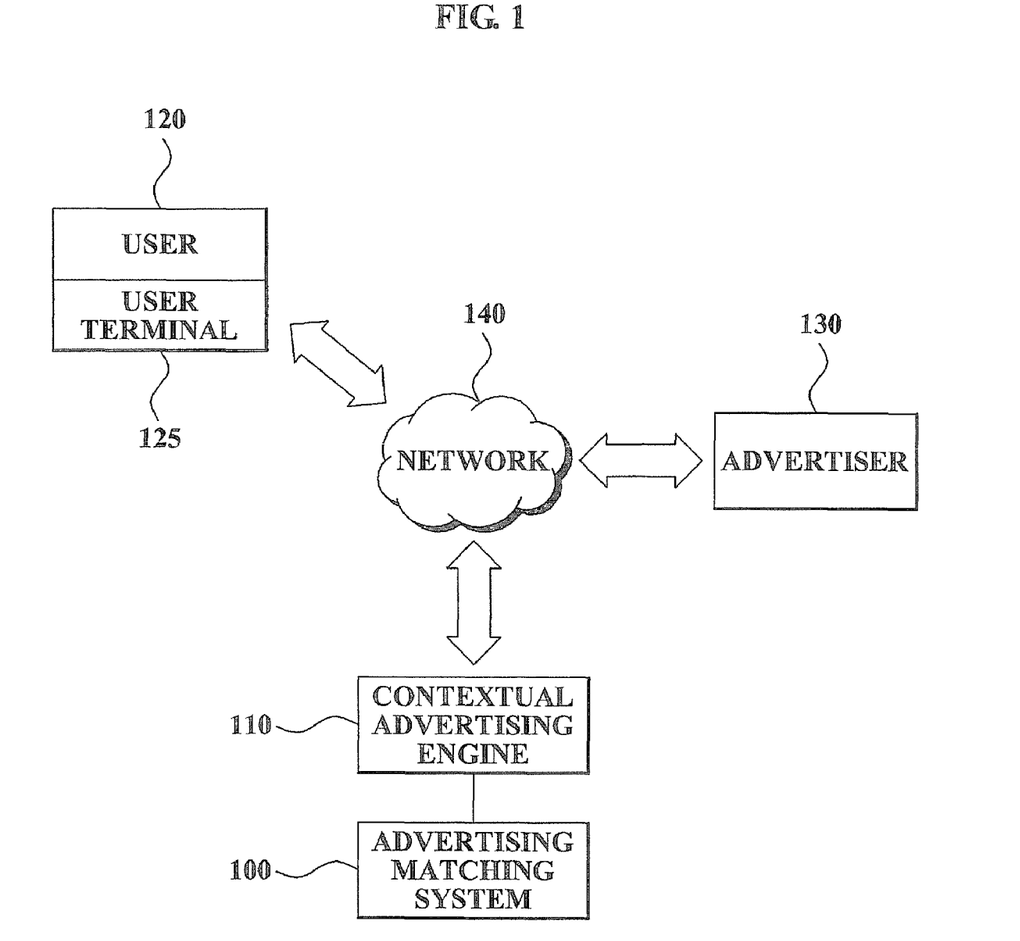
FIG. 1 is a diagram illustrating an operation of an advertising matching system according to an exemplary embodiment of the present invention.

FIG. 1 is a diagram illustrating an operation of an advertising matching system 100 according to an exemplary embodiment of the present invention.

The advertising matching system 100 determines a seed of a content page, retrieves advertising information corresponding to the seed, and displays the retrieved advertising information for a user 120, when providing contextual advertising to the user 120. Specifically, in the present exemplary embodiment, the advertising matching system 100 may include an advertiser group and a keyword group in a single seed, and thereby retrieve various types of advertising information with a common property, matching the seed. In this instance, the keyword group corresponds to a group of keywords purchased by a particular advertiser 130 included in the advertiser group.

An advertising list is generated corresponding to the seed. In the advertising list, a plurality of advertising information about the advertiser 130 or corresponding to promotion and marketing materials about business items of the advertiser 130 is sorted according to a predetermined standard. The advertising list may be displayed for the user 120 with the content page. In the present exemplary embodiment, the advertising list may be generated by utilizing all advertising information of advertisers included in a particular seed.

A contextual advertising engine 110 may indicate an advertising service server which supports an advertising service by displaying the content page and either the advertising list or advertising information for the user 120. In this instance, the advertising information is retrieved in association with the content page that the user 120 reads.

The user 120 may indicate an Internet user which maintains a user terminal 125 to access the contextual advertising engine 110, and utilizes the content page and advertising information (advertising list) via the user terminal 125.

The advertiser 130 may indicate an operator of a commercial website which displays advertising information of the advertiser 130 corresponding to the content of the content page, and induces the user's access to a corresponding website according to the user's click on the displayed advertising information.

The user terminal 125 maintains a connection state with the advertising matching system 100 or the contextual advertising engine 110 via a network 140, such as the Internet and the like. Also, the user terminal 125 realizes an advertising list corresponding to the content of the content page that the user 120 reads, and displays the adverting list for the user 120.

The advertising matching system 100 may determine a seed by analyzing the content of the content page, and retrieve an advertising list corresponding to the determined seed. Accordingly, the advertising matching system 100 may display various types of advertising information of the advertiser 130 with an identical property for the user 120 via the contextual advertising.

Also, when associating a keyword with a seed, only one keyword, which is not associated with a plurality of seeds, is associated with one particular seed. Accordingly, when determining a seed of a content page, the seed may be explicitly determined.

Hereinafter, a configuration of an advertising matching system according to the present invention will be described with reference to FIG. 2.

Figure 2:
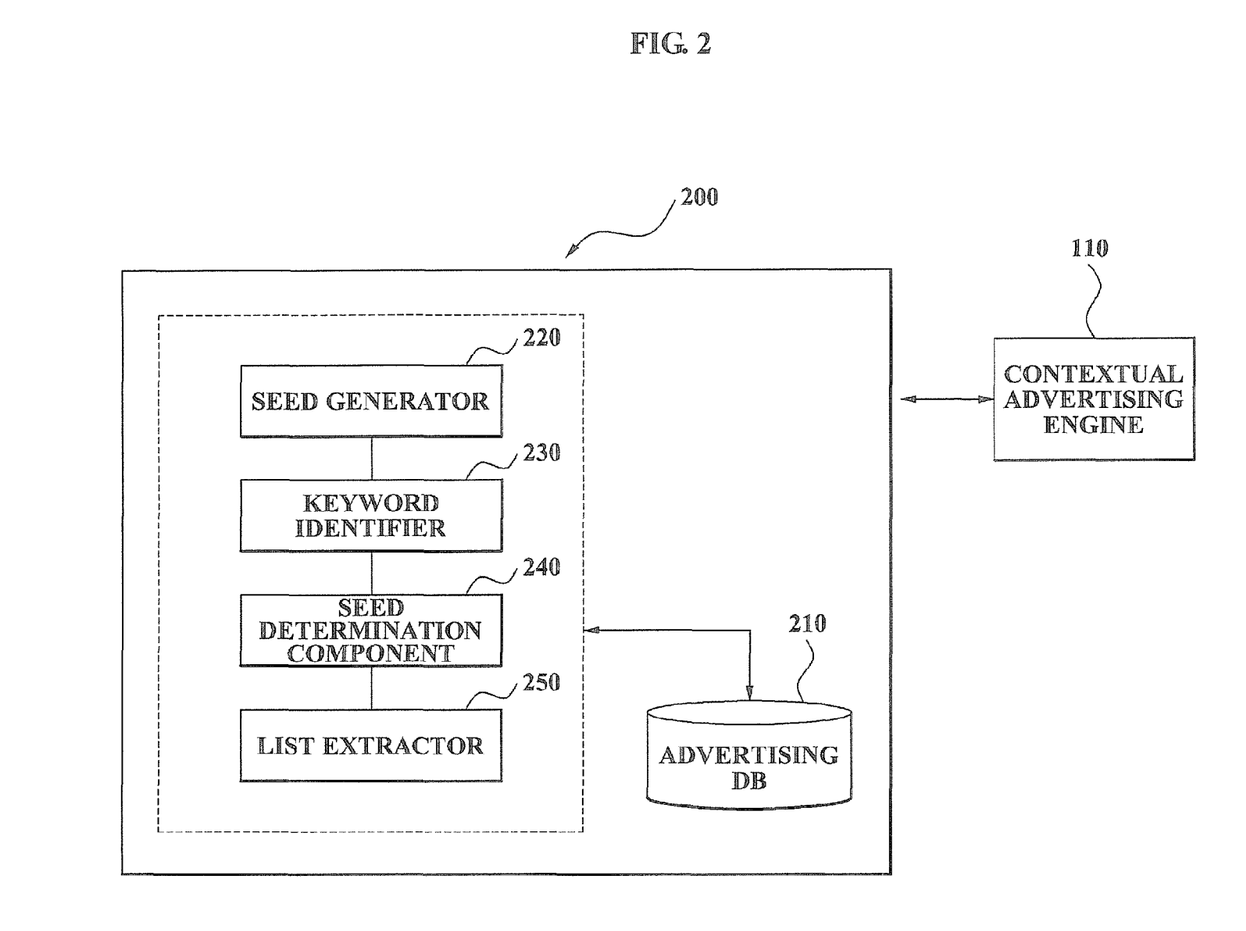
FIG. 2 is a block diagram illustrating a configuration of an advertising matching system according to an exemplary embodiment of the present invention.

FIG. 2 is a block diagram illustrating a configuration of an advertising matching system 200 according to an exemplary embodiment of the present invention.

The advertising matching system 200 may include an advertising database 210, a seed generator 220, a keyword identifier 230, a seed determination component 240, and a list extractor 250.

Generating of a content page will be described prior to describing the configuration of the advertising matching system 200.

The content page may correspond to medium information which transmits information to the user 120 via the network 140. The content page may be generated through various types of processes. As an example, according to the present exemplary embodiment, a content page corresponding to a search keyword may be generated in response to a search request, which is generated when a user enters the search keyword in a search site. A search engine is generally in charge of generating a content page corresponding to the search keyword. In this instance, the search engine may appropriately search for a user's desired content and generate the content page using the retrieved content. The content page may include a text-in-keyword. The text-in-keyword is utilized when reading advertising information according to the contextual advertising.

Describing the configuration of the advertising matching system 200, the advertising database 210 receives advertising information corresponding to promotion and marketing materials of the advertiser 130, from the advertiser 130, and stores the advertising information in association with the advertiser 130. Also, the advertising database 210 may store a seed corresponding to an advertising list. In this instance, the seed is generated by the seed generator 220, which will be described later. Also, the advertising list sorts advertising information of the advertiser 130 included in the seed. Specifically, the advertising database 210 functions to associate and maintain a keyword group or an advertiser group (seed) with an advertising list. In this instance, the keyword group and the advertiser group are classified according to a keyword property and an advertiser property respectively, in association with a contextual advertising service.

The seed generator 220 receives a selection of a keyword associated with advertisement information from each of a plurality of advertisers, and includes the plurality of advertisers, selecting a first keyword, in a single seed. Specifically, the seed generator 220 generates a seed for a keyword, which is selected from the plurality of advertisers 130, among keywords selected from a particular advertiser 130 who desires to utilize the contextual advertising service. Accordingly, the plurality of advertisers 130 may be included in a seed associated with a particular keyword. In this instance, there is no particular constraint on when the particular keyword is selected. As an example, when storing advertising information in the advertising database 210, the particular keyword may be entered from the advertiser 130.

Also, when a seed-out-of advertiser selects a second keyword, different from the first keyword, from keywords selected by a seed-in advertiser included in the seed, the seed generator 220 includes the seed-out-of advertiser in a seed associated with the seed-in advertiser. Specifically, the seed generator 220 may expand a particular seed by including a seed-out-of advertiser, which selects a keyword selected from a seed-in advertiser included in the particular seed, in the identical particular seed.

The advertising matching system 200 generates an advertising list via a predetermined list generator (not shown). In the advertising list, all advertising information of the plurality of advertisers included in a seed is sorted. The generated advertising list is stored in the advertising database 210 corresponding to the seed. When generating the advertising list, the list generator 220 may determine a location in the advertising list to display corresponding advertising information according to, for example, an assigned ranking point. As an example, the advertising matching system 200 may assign a ranking point to each of advertising information based on a cost per click (CPC), a cost per impression (CPI), a valid click rate, and the like. Advertising information assigned with a comparatively high ranking point may be displayed in an upper portion.

Figure 3:
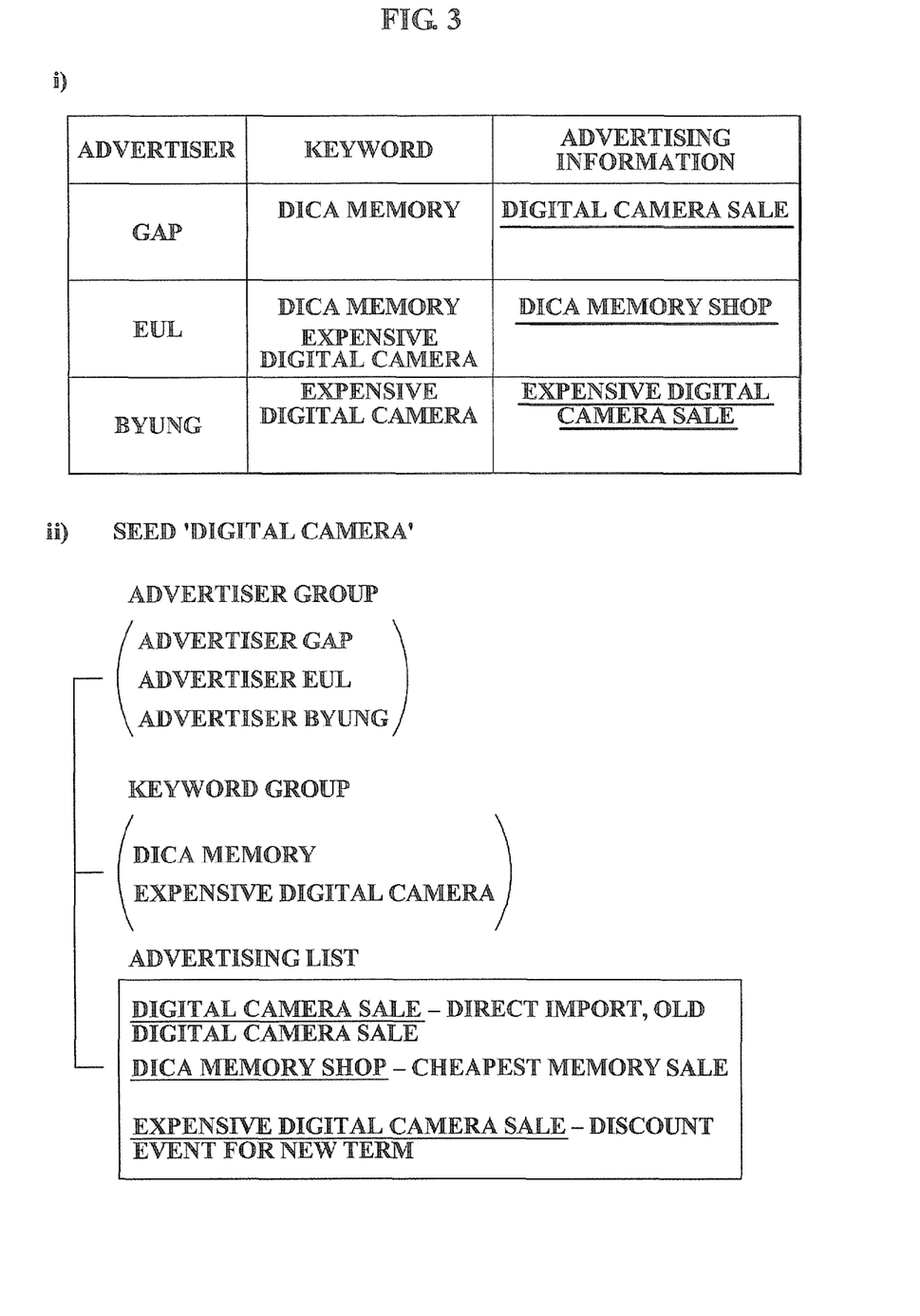
FIG. 3, parts i) and ii), illustrate an example of associating a keyword or an advertiser with a seed according to an exemplary embodiment of the present invention.

FIG. 3, parts i) and ii), illustrate an example of associating a keyword or an advertiser with a seed according to an exemplary embodiment of the present invention.

Part i) of FIG. 3 illustrates the advertising database 210 which stores keywords that a particular advertiser purchased for contextual advertising, and advertising information corresponding to each of the keywords. As an example, referring to the advertising database 210 shown in part i) of FIG. 3, an advertiser 'GAP' purchased a keyword, 'dica memory', for contextual advertising, and stores the purchased keyword 'dica memory' to correspond to advertising information 'digital camera sale'

Also, the seed generator 220 identifies an advertiser 'EUL' who purchased the keyword 'dica memory' same as the keyword purchased by the advertiser 'GAP', and includes the identified advertiser 'EUL' in a seed 'digital camera' associated with the advertiser 'GAP'. Accordingly, the seed 'digital camera' may be simultaneously associated with an advertiser group including the advertisers 'GAP' and 'EUL', and a keyword group including the keyword 'dica memory'.

Also, the seed generator 220 identifies a seed-out-of advertiser 'BYUNG' which also purchased a keyword 'expensive digital camera' corresponding to another keyword purchased by the seed-in advertiser 'EUL' included in the seed 'digital camera, and includes the identified seed-out-of advertiser 'BYUNG' in the seed 'digital camera' associated with the seed-in advertiser 'EUL'. Accordingly, as shown in part ii) of FIG. 3, the seed 'digital camera' may be simultaneously associated with an advertiser group including the advertisers, 'GAP', 'EUL', and 'BYUNG', and a keyword group including the keywords, 'dica memory' and 'expensive digital camera'.

When the advertising matching system 200 determines a property of the content page as 'digital camera' under the condition that the seed 'digital camera' is stored in the advertising database 210 as shown in FIG. 3, advertising information of the advertisers associated with the seed 'digital camera' may be retrieved. Specifically, three advertising information including 'digital camera sale' may be retrieved.

As described above, the seed generator 220 includes advertisers with an identical property in a single seed, and displays advertising information of the advertisers, included in the seed, for the user 120 according to a single condition.

Also, the seed generator 220 may prevent keyword being explicitly determined due to a keyword associated with a plurality of seeds by excluding the keyword from the seed. As an example, the advertising database 210 may select the keyword 'digital camera', not the keyword 'digital', as the keyword associated with the seed, and thereby may fundamentally prevent the keyword 'digital' from being variously interpreted, such as 'digital television', 'digital broadcasting', 'digital camera', and the like. Also, the advertising database 210 may associate only an explicit keyword, such as 'camera lens', 'contact lens', and the like, not a keyword 'lens' associated with a plurality of seeds, with a seed and thereby precisely determine the seed.

When the content page is generated, the keyword identifier 230 of the advertising matching system 200 identifies a text-in-keyword from the content page. Specifically, the keyword identifier 230 identifies a keyword capable of representing a content of the content page, as the text-in-keyword, from a plurality of keywords included in the content page. In the present exemplary embodiment, the text-in-keyword may be determined by determining whether a corresponding keyword is identical to a keyword that the advertiser 130, which desires to utilize a contextual advertising service, pre-purchased and stored in the advertising database 210.

As an example, when a content page including a content 'current digital camera market state' is generated, the keyword identifier 230 may identify a keyword 'dica memory' purchased by the advertiser 130, as a text-in-keyword, from keywords included in the content page.

Also, the keyword identifier 230 may analyze a content of a content page and thereby select a keyword, capable of representing the analyzed content, as a text-in-keyword. As an example, with respect to the content page including the content 'current digital camera market state', the keyword identifier 230 may identify a keyword, 'exclusive dica memory', 'expensive digital camera', or the like corresponding to the content of the content page as the text-in-keyword.

The seed determination component 240 determines a seed of the content page by considering the identified text-in-keyword. Specifically, the seed determination component 240 functions to extract the seed including the text-in-keyword by referring to the advertising database 210, and thereby determine the seed of the content page. In the above-described example, the seed determination component 240 may determine the seed of the content page by identifying the seed 'digital camera' which includes the identified text-in-keyword 'dica memory' as the keyword group as illustrated in FIG. 3.

The list extractor 250 extracts an advertising list corresponding to the determined seed from the advertising database 210. As described above, the advertising database 210 stores advertising information of the advertiser 130 associated with the seed. Also, the advertising database 210 may store the advertising list, which is generated by sorting the advertising information, corresponding to the seed. Specifically, the list extractor 250 may search the advertising database 210 for the advertising list that is generated by corresponding to the determined seed.

The contextual advertising engine 110 may display the retrieved advertising list and the content page for the user 120. As an example, the contextual advertising engine 110 may allocate an area, distinguished from a display area of the content page, as a display area of the advertising list depending upon supporting of the contextual advertising. In this instance, the contextual advertising engine 110 may display the retrieved advertising list in the display area and thereby readily display advertising information for the user 120 which reads the content page.

As described above, according to the present invention, it is possible to determine a seed of a content page, and display the content page and an advertising list corresponding to the seed for the user 120 and thereby display various types of advertising information of the advertiser 130 corresponding to the content of the content page for the user 120.

Also, according to the present invention, it is possible to construct a keyword associated with only a single keyword, and thereby determine an optimal seed of a content including a keyword associated with a plurality of seeds.

Figure 4:
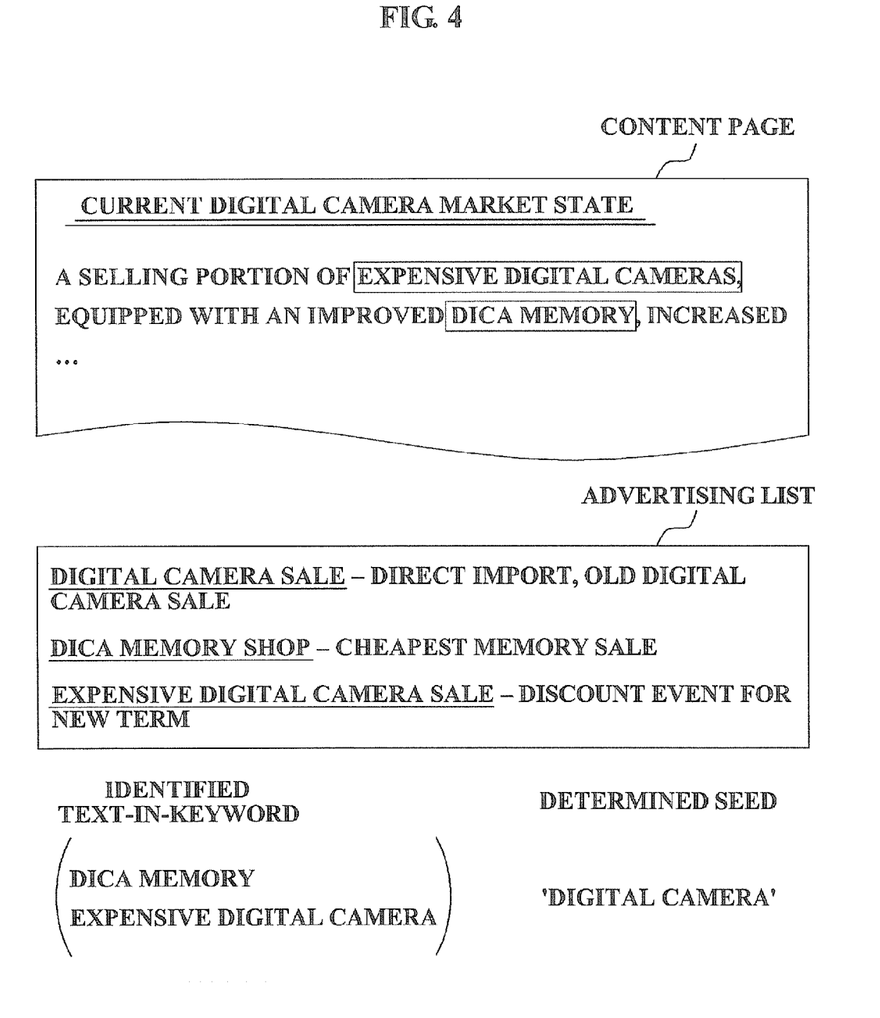
FIG. 4 illustrates an example of advertising matching using a seed according to an exemplary embodiment of the present invention.

FIG. 4 illustrates an example of advertising matching using a seed according to an exemplary embodiment of the present invention.

Referring to FIG. 4, a content page to display for the user 120 includes a content 'current digital camera market state'. Also, as shown in FIG. 3, the advertising database 210 stores the advertising list corresponding to the seed 'digital camera'. In this instance, the advertising list is generated by utilizing advertising information of an advertiser included in the seed 'digital camera'.

The advertising matching system 200 identifies keywords, 'dica memory' and 'expensive digital camera', which are determined as representative keywords, as text-in-keywords, from the content of the content page 'current digital camera market state' as shown in FIG. 4. Also, the advertising matching system 200 determines the seed 'digital camera' of the content page by considering the identified text-in-keywords 'dica memory' and 'expensive digital camera'. When determining the seed, the advertising matching system 200 may generate reliability information by comparing the identified text-in-keywords with a keyword group of the seed, which is stored in the advertising database 210. Also, the advertising matching system 200 may determine a seed, which can satisfy predetermined reliability information, as the seed of the content page. Referring to FIG. 4, the seed 'digital camera', which includes the text-in-keywords 'dica memory' and 'expensive digital camera' and also has a certain level of reliability information, for example, greater than 90% of reliability, as the seed of the content page.

Also, the advertising matching system 200 searches the advertising database 210 for the advertising list corresponding to the seed 'digital camera' as illustrated in FIG. 3. In the advertising list, advertising information of a plurality of advertisers included in the seed is sorted according to ranking points. Accordingly, the retrieved advertising list corresponding to the determined seed 'digital camera' may display advertising information 'digital camera sale' with a highest ranking point in a top portion.

The advertising matching system 200 may display the content page and the retrieved advertising list for the user 120 via the contextual advertising engine 110, and thereby faithfully achieve the purpose of contextual advertising to display optimal advertising corresponding to a content.

As described above, according to the present invention, it is possible to determine a property of a content page using a seed, and display various types of advertising information of a plurality of advertisers with a common property, as contextual advertising, for a user.

Also, according to the present invention, it is possible to construct a keyword associated with only a single seed, and thereby explicitly determine a seed of a content page.

Hereinafter, operational flow of an advertising matching system according to an exemplary embodiment will be described in detail.

Figure 5:
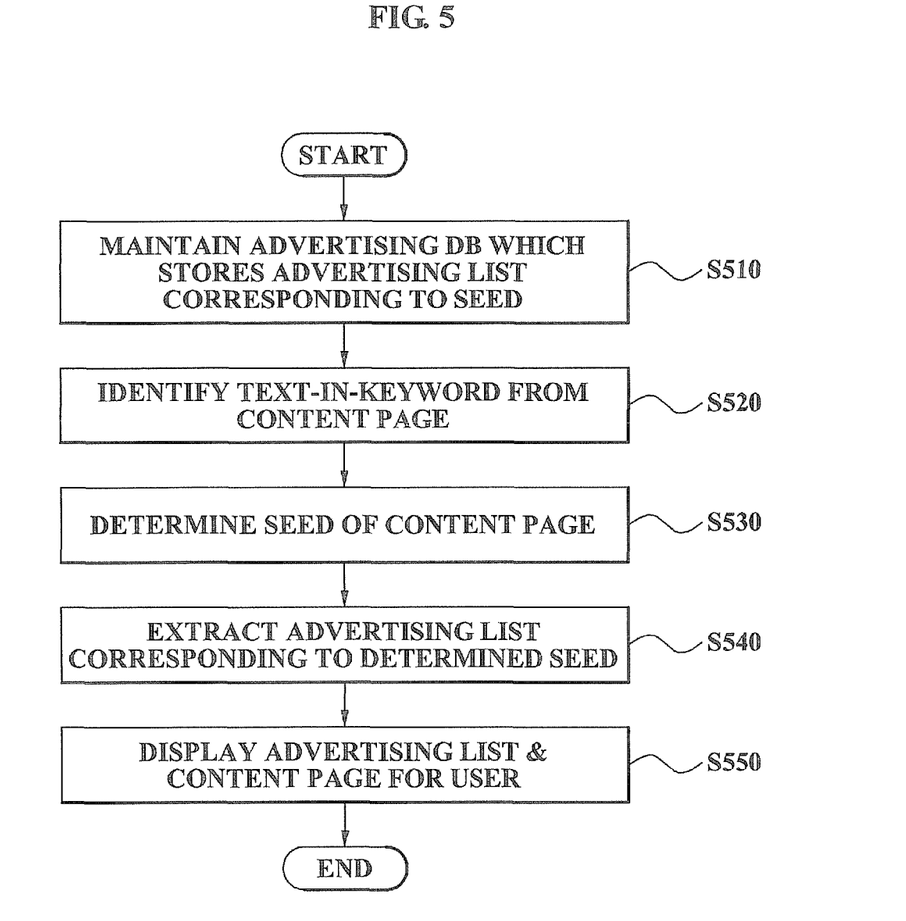
FIG. 5 is a flowchart illustrating a method of matching advertising using a seed according to an exemplary embodiment of the present invention.

FIG. 5 is a flowchart illustrating a method of matching advertising using a seed according to an exemplary embodiment of the present invention. The advertising matching method is performed by the above-described advertising matching system 200.

In operation S510, the advertising matching system 200 maintains the advertising database 210 which stores an advertising list corresponding to a seed. Operation S510 is a process of associating the advertiser 130, which desires to utilize a contextual advertising service, and a keyword purchased by the advertiser 130 with a particular seed, and thereby making a plurality of advertising information with an identical property correspond to the particular seed.

Specifically, in operation S510, the advertising matching system 200 may include a plurality of advertisers 130 with a similar property in a single seed by considering keywords purchased by the plurality of advertisers 130, and display advertising information of the plurality of advertisers 130 included in the seed for the user 120 according to a single condition.

Figure 6:
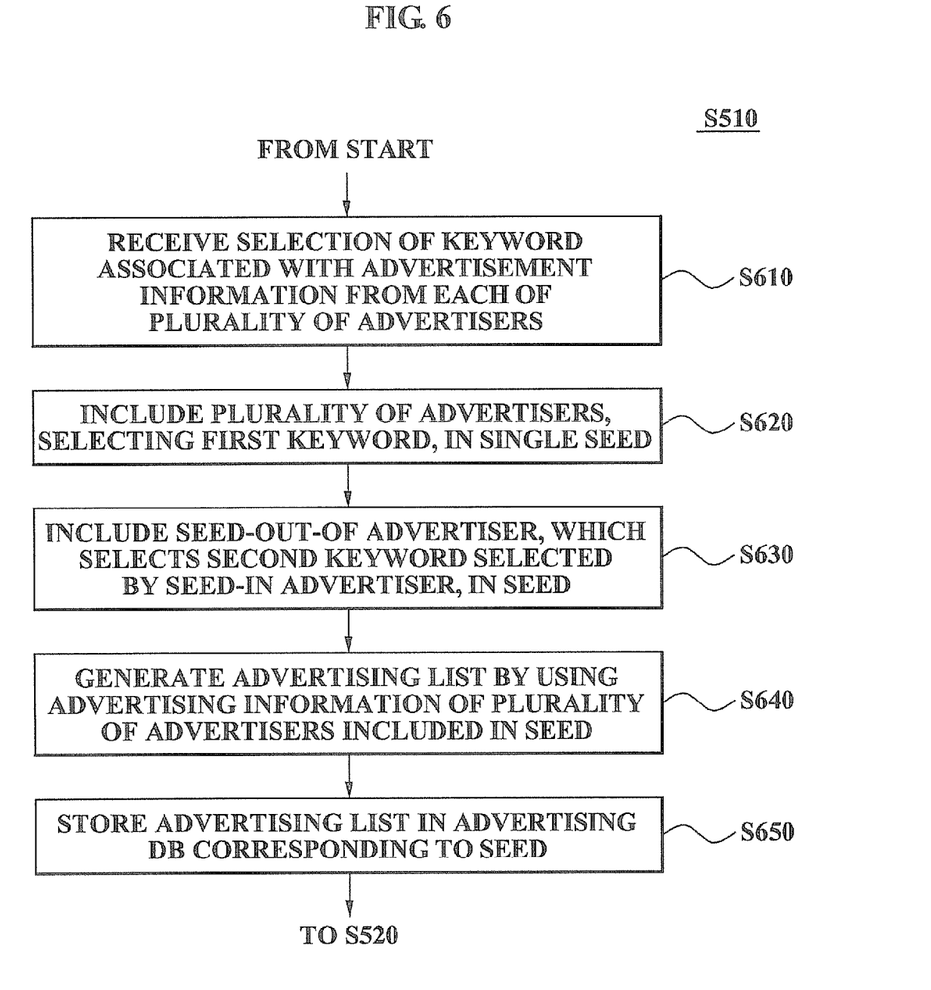
FIG. 6 is a flowchart illustrating an example of determining an advertiser and a keyword associated with a seed according to an exemplary embodiment of the present invention.

FIG. 6 is a flowchart illustrating an example of determining an advertiser and a keyword associated with a seed according to an exemplary embodiment of the present invention.

In operation S610, the advertising matching system 200 receives a selection of a keyword associated with advertisement information from each of a plurality of advertisers. Operation S610 is a process of receiving a keyword from the advertiser 130 which desires to utilize the contextual advertising service. In this instance, the keyword causes advertising information of the advertiser 130 to be extracted.

In operation S620, the advertising matching system 200 includes the plurality of advertisers 130, selecting a first keyword, in a single seed. Operation S620 is a process of including the plurality of advertisers 130 in the single seed according to a determination that the plurality of advertisers 130, which purchased the identical keyword, includes the identical property. Accordingly, the advertising matching system 200 may associate an advertiser group with a seed.

In operation S630, the advertising matching system 200 includes a seed-out-of advertiser in a seed associated with a seed-in advertiser when the seed-out-of advertiser selects a second keyword, different from the first keyword selected by the seed-in advertiser included in the seed. Operation S630 is a process of including the seed-out-of advertiser, which selects a keyword selected by the seed-in advertiser, in the identical seed according to a determination that keywords purchased by a particular advertiser includes the identical property. As an example, under the condition that the seed-out-of advertiser purchased the second keyword corresponding to another keyword purchased by the seed-in advertiser which is included in the seed by the first keyword in operation S620, the advertising matching system 200 may determine both the seed-in advertiser and the seed-out-of advertiser include the identical property. Accordingly, the advertising matching system 200 classifies the seed-in advertiser and the seed-out-of advertiser into an advertiser group, and also classifies the first keyword and the second keyword into a keyword group, and associates the classified advertiser group and the keyword group in a single seed.

As described above, according to the present invention, it is possible to accurately and variously classify a plurality of advertisers with the identical property via continuous seed expansion.

In operation S640, the advertising matching system 200 generates an advertising list by using advertising information of the plurality of advertisers 130 included in the seed. Operation S640 is a process of sorting advertising information of the plurality of advertisers 130 associated with a particular seed, and making a list. As an example, the advertising list may be generated by sorting advertising information according to a ranking point assigned to the advertising information. Specifically, in operation S640, the advertising matching system 200 may generate the advertising list by assigning a ranking point to advertising information of each of the plurality of advertisers 130 included in the seed, determining a location of the advertising information in the advertising list according to the assigned ranking point, and displaying the advertising information in the determined location.

In operation S650, the advertising matching system 200 stores the generated advertising list in the advertising database 210 corresponding to the seed. Operation S650 is a process of making the advertising list, which is generated by using advertising information of the advertiser 130 associated with a particular seed, correspond to the particular seed, and determining the advertising list to be displayed on the content page for the user 120.

As described above, according to the present invention, it is possible to classify a plurality of advertisers with an identical property into a single seed, and display advertising information of the plurality of advertisers for a user in association with the seed.

Referring again to FIG. 5, in operation S520, the advertising matching system 200 identifies a text-in-keyword from a content page that is generated according to a predetermined procedure. Operation S520 is a process of identifying the text-in-keyword capable of representing the content of the content page. In this instance, the advertising matching system 200 may identify a keyword, previously purchased by the advertiser 130, as the text-in-keyword, from keywords included in the content page. Also, the advertising matching system 200 may identify a predetermined optimal keyword corresponding to the content of the content page as the text-in-keyword.

Particularly, in operation S520, the advertising matching system 200 may extract a keyword, which is associated with only a single seed, as the text-in-keyword. Specifically, the advertising matching system 200 may not extract a keyword which may be associated with a plurality of seeds, and may extract a keyword associated with only a single seed. Accordingly, a seed determination may be explicitly performed.

In operation S530, the advertising matching system 200 determines a seed of the content page by considering the identified text-in-keyword. Operation S530 is a process of inferring the content of the content page from the identified text-in-keyword.

Figure 7:
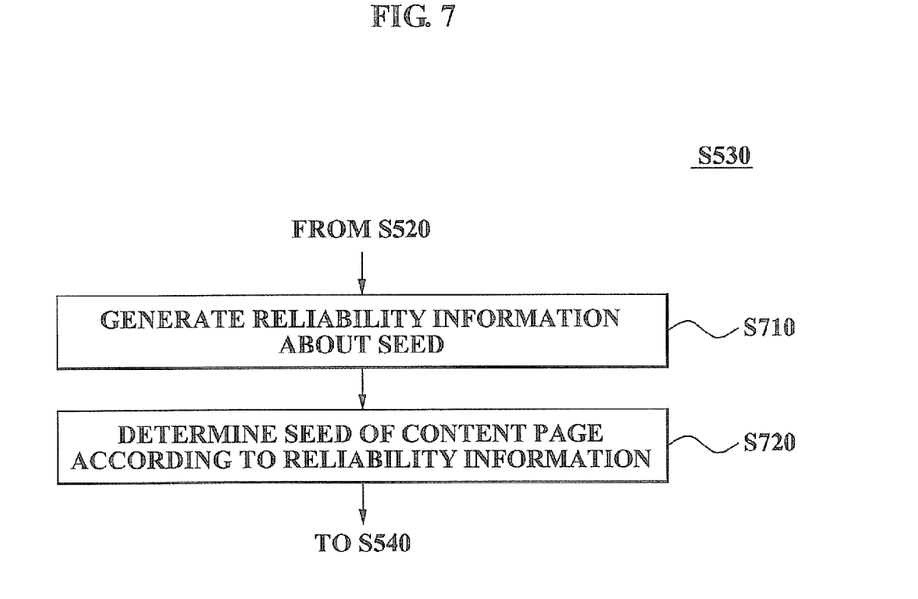
FIG. 7 is a flowchart illustrating an example of determining a seed of a content page according to an exemplary embodiment of the present invention.

FIG. 7 is a flowchart illustrating an example of determining a seed of a content page according to an exemplary embodiment of the present invention.

In operation S710, the advertising matching system 200 generates reliability information about the seed depending upon a matching degree between the identified text-in-keyword and the keyword selected from each of the plurality of advertisers 130 included in the seed. Operation S710 is a process of calculating reliability information of the seed by using a number of matching keywords between the text-in-keyword identified from the content page and keywords of the keyword group associated with the seed. As an example, when the identified text-in-keyword exactly matches the keyword associated with the particular seed, the advertising matching system 200 may generate reliability information of the seed as '100%'.

In operation S720, the advertising matching system 200 determines the seed of the content page according to the generated reliability information. Operation S720 is a process of determining a property of the content page. As an example, a single seed with highest reliability information may be determined as a most appropriate seed for the content of the content page. Also, a plurality of seeds may be simultaneously selected, as necessary, according to reliability distributions. As an example, 'jeans' and 'jean jacket'.

Specifically, in operation S530, the advertising matching system 200 recognizes the property of the content page, and determines the seed of the content page.

In operation S540, the advertising matching system 200 extracts an advertising list corresponding to the determined seed from the advertising database. Operation S540 is a process of retrieving advertising information, i.e. an advertising list, corresponding to the content of the content page.

In operation S550, the advertising matching system 200 displays the retrieved advertising list and the generated content page for the user 120. Operation S550 is a process of simultaneously displaying the content page, which is generated by the contextual advertising engine 100 in response to a search request, and the advertising list, which is retrieved via the seed corresponding to the content of the content page, for the user 120. In this instance, the contextual advertising engine 110 supports contextual advertising.

As described above, according to the present invention, it is possible to determine a seed by analyzing a content of a content page, and retrieve an advertising list corresponding to the determined seed, and thereby display advertising information of a plurality of advertisers with an identical property for a user 120 via contextual advertising.

Also, according to the present invention, it is possible to include a keyword associated with only a single seed, in the seed. Accordingly, when determining a seed of a content page, the seed may be more explicitly determined.

The advertising matching method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter.

According to the present invention, there is provided a method of generating an advertising list using a seed, which can determine a property of a content page using a seed, and thereby can display various types of advertising information of a plurality of advertisers with the determined property, as contextual advertising, for a user, and an advertising matching system using the method.

Also, according to the present invention, there is provided a method of generating an advertising list using a seed, which can construct a keyword which is not associated with a plurality of seeds, and associate the keyword with only a single seed, and thereby can more accurately determine a seed of the content page, and an advertising matching system using the method.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including"

and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A computer-implemented method of matching advertising, the method comprising the steps of:
   receiving a selection of one or more keywords and advertising information for ads from advertisers;
   associating a group of advertisers with a first seed, the first seed including a group of keywords selected by said group of advertisers, the group of keywords including a first representative keyword, wherein more than one of said advertisers have selected the first representative keyword;
   storing a first advertising list corresponding to said first seed in an advertising database and storing the advertising database in a memory, the first advertising list including advertising information of said group of advertisers tied to the first seed;
   receiving a selection of one or more keywords and advertising information for ads from a first advertiser;
   determining if at least one of said one or more keywords of the first advertiser is included in said group of keywords of the first seed;
   if at least one of said one or more keywords is included in said group of keywords of the first seed, associating the first advertiser with the first seed and associating the advertising information of the first advertiser with the first advertising list;
   if the remaining keywords of the first advertiser are not included in said group of keywords, expanding said group of keywords so as to include said remaining keywords of the first advertiser;
   determining at least one keyword of content of a target web page;
   determining a seed for the target web page based on a group of keywords of the first seed and the determined at least one keyword of the content; and
   providing ads using an advertising list corresponding to the determined seed from the advertising database.

2. The method of claim 1, wherein the step of determining at least one keyword of content of a target web page comprises the step of:
   extracting a keyword associated with only the first seed, as the text-in-keyword.

3. The method of claim 1, wherein the step of determining a seed comprises the steps of:
   generating reliability information about seeds based on a matching degree between the determined keyword of the content and the keyword selected from each of the plurality of advertisers included in said seeds; and
   determining a seed for the content of the target web page based on the generated reliability information.

4. The method of claim 1, wherein the predetermined procedure corresponds to a process of generating the content page in response to a search request from a user, and
   the step of providing ads comprises the step of:
   displaying the extracted advertising list and the generated content page for the user.

5. The method of claim 1, wherein the advertising list is generated by performing the steps of:
   assigning a ranking point to advertising info of each of the plurality of advertisers which are included in the seed; and
   sorting the advertising information by considering the ranking point.

6. One or more non-transitory storage media having stored thereon a computer program that, when executed by one or more processors, causes the one or more processors to perform acts including:
   receiving a selection of one or more keywords and advertising information for ads from advertisers;
   associating a group of advertisers with a first seed, the first seed including a group of keywords selected by said group of advertisers, the group of keywords including a first representative keyword, wherein more than one of said advertisers have selected the first representative keyword;
   storing a first advertising list corresponding to said first seed in an advertising database, the first advertising list including advertising information of said group of advertisers tied to the first seed;
   receiving a selection of one or more keywords and advertising information for ads from a first advertiser;
   determining if at least one of said one or more keywords of the first advertiser is included in said group of keywords of the first seed;
   if at least one of said one or more keywords is included in said group of keywords of the first seed, associating the first advertiser with the first seed and associating the advertising information of the first advertiser with the first advertising list;
   if the remaining keywords of the first advertiser are not included in said group of keywords, expanding said group of keywords so as to include said remaining keywords of the first advertiser;
   determining at least one keyword of content of a target web page;
   determining a seed for the target web page based on a group of keywords of the first seed and the determined at least one keyword of the content; and
   providing ads using an advertising list corresponding to the determined seed from the advertising database.

7. A system for matching advertising, comprising:
a processor;
a seed generator configured to associate a group of advertisers with a first seed, the first seed including a group of keywords selected by said group of advertisers, the group of keywords including a first representative keyword, wherein more than one of said advertisers have selected the first representative keyword;
one or more memories to communicate with the processor, the one or more memories storing an advertising database, the advertising database including an advertising list corresponding to the first seed, the advertising list including advertising information of the group of advertisers tied to the first seed;
a keyword identifier configured to determine at least one keyword of content of a target web page;
a seed determination component configured to determine a seed for the target web page based on a group of the first seed and the determined at least one keyword; and
a list extractor for extracting an advertising list corresponding to the determined seed from the advertising database to provide ads using the extracted advertising list,
wherein said seed generator receives a selection of one or more keywords and advertising information for ads from a first advertiser, said seed generator determines if at least one of said one or more keywords of the first advertiser is included in said group of keywords of the first seed, if at least one of said one or more keywords is included in said group of keywords of the first seed, said seed generator associates the first advertiser with the first seed and associating the advertising information of the first advertiser with the first advertising list, and if the remaining keywords of the first advertiser are not included in said group of keywords, the seed generator expands said group of keywords so as to include said remaining keywords of the first advertiser.

8. The system of claim 7, wherein the keyword identifier extracts a keyword associated with only the seed, as the text-in-keyword.

9. The system of claim 7, wherein the seed determination component generates reliability information about seeds based on a matching degree between the identified text-in-keyword and the keyword selected from each of the plurality of advertisers included in the seeds, and determines a seed for the content of the target web page based on the generated reliability information.

10. The system of claim 7, wherein the advertising list is generated by assigning a ranking point to advertising information of each of the plurality of advertisers which are included in the seed, and sorting the advertising information by considering the ranking point.

11. A computer-implemented method of matching advertising, the method comprising the steps of:
receiving a selection of at least one keyword and advertising information for ads from advertisers;
associating a group of advertisers with a first seed, the first seed including a group of keywords selected by said group of advertisers, the group of keywords including a first representative keyword, wherein more than one of said advertisers have selected the first representative keyword;
storing a first advertising list in an advertising database corresponding to the first seed and storing the advertising database in a memory, the first advertising list including advertising information of the group of advertisers tied to the first seed;
receiving a selection of one or more keywords and advertising information for ads from a first advertiser;
determining if at least one of said one or more keywords of the first advertiser is included in said first group of keywords;
if at least one of said one or more keywords is included in said group of keywords of the first seed, associating the first advertiser with the first group and associating the advertising information of the first advertiser with the first advertising list;
if the remaining keywords of the first advertiser are not included in said group of keywords, expanding said group of keywords so as to include said remaining keywords of the first advertiser;
determining at least one keyword of content of a target web page;
determining whether the content of the target web page is related to a group of related keywords based on the determined at least one keyword of the content; and
providing ads using an advertising list corresponding to the determined group from the advertising database.

12. The method of claim 11, wherein the step of determining whether the content of the target web page is related to a group of keywords comprises the steps of:
generating reliability information about the group depending upon a matching degree between the determined at least one keyword of the content and the keyword selected from each of the plurality of advertisers included in the group; and
determining the group for the content of the target web page according to the generated reliability information.

13. The method of claim 11, wherein the advertising list is generated by performing the steps of:
assigning a ranking point to advertising information of each of the plurality of advertisers which are included in the group; and
sorting the advertising information by considering the ranking point.

14. One or more storage media having stored thereon a computer program that, when executed by one or more processors, causes the one or more processors to perform acts including:
receiving a selection of at least one keyword and advertising information for ads from advertisers;
associating a group of advertisers with a first seed, the first seed including a group of keywords selected by said group of advertisers, the group of keywords including a first representative keyword, wherein more than one of said advertisers have selected the first representative keyword;
storing a first advertising list in an advertising database corresponding to the first seed, the first advertising list including advertising information of the group of advertisers tied to the first seed;
receiving a selection of one or more keywords and advertising information for ads from a first advertiser;
determining if at least one of said one or more keywords of the first advertiser is included in said first group of keywords;
if at least one of said one or more keywords is included in said group of keywords of the first seed, associating the first advertiser with the first group and associating the advertising information of the first advertiser with the first advertising list;

if the remaining keywords of the first advertiser are not included in said group of keywords, expanding said group of keywords so as to include said remaining keywords of the first advertiser;

determining at least one keyword of content of a target web page;

determining whether the content of the target web page is related to a group of related keywords based on the determined at least one keyword of the content; and providing ads using an advertising list corresponding to the determined group from the advertising database.

* * * * *